United States Patent
Nakayama

(10) Patent No.: US 8,217,766 B2
(45) Date of Patent: Jul. 10, 2012

(54) VEHICLE PRESENCE NOTIFICATION APPARATUS

(75) Inventor: Toshiaki Nakayama, Miyoshi (JP)

(73) Assignee: Denso Corporation, Kariya (JP)

( * ) Notice: Subject to any disclaimer, the term of this patent is extended or adjusted under 35 U.S.C. 154(b) by 38 days.

(21) Appl. No.: 12/985,653

(22) Filed: Jan. 6, 2011

(65) Prior Publication Data

US 2011/0175713 A1     Jul. 21, 2011

(30) Foreign Application Priority Data

Jan. 15, 2010    (JP) .................................. 2010-6876

(51) Int. Cl.
    *G08B 3/00*         (2006.01)
    *B60Q 1/00*         (2006.01)
    *G01S 15/00*       (2006.01)

(52) U.S. Cl. ........... 340/384.1; 340/426.23; 340/426.24; 340/436; 340/474; 340/692; 340/384.73; 367/91; 367/93; 367/99; 367/118

(58) Field of Classification Search ............... 340/384.1, 340/474; 367/91, 93
See application file for complete search history.

(56) References Cited

U.S. PATENT DOCUMENTS

| 6,469,956 | B1 * | 10/2002 | Zeng ............................. 367/116 |
| 2007/0257783 | A1 | 11/2007 | Matsumoto et al. |
| 2010/0231368 | A1 | 9/2010 | Nakayama et al. |

FOREIGN PATENT DOCUMENTS

| JP | S60-31075 | 2/1985 |
| JP | H2-15532 U | 1/1990 |
| JP | 10-201001 | 7/1998 |
| JP | 2007-237831 | 9/2007 |
| JP | 2007-328603 | 12/2007 |

OTHER PUBLICATIONS

Japanese Office Action dated Oct. 18, 2011, issued in corresponding Japanese Application No. 2010-006876 with English Translation.

* cited by examiner

*Primary Examiner* — Donnie Crosland
(74) *Attorney, Agent, or Firm* — Nixon & Vanderhye PC

(57) ABSTRACT

A vehicle presence notification apparatus uses several ultrasonic transducer devices to generate a notice sound by emitting an ultrasonic wave in mid air based on an ultrasonic signal modulated according to an audible sound. At least one of the speaker-use ultrasonic transducer devices is a two-way transducer device that is enabled to perform not only transmission but also reception of an ultrasonic wave. When a vehicle velocity is equal to or greater than a predetermined value, the two-way transducer device is caused to function as an ultrasonic sensor. Thus, even when the generation of any notice sound is unnecessary due to the vehicle velocity being fast, the vehicle presence notification apparatus can be used as an ultrasonic sensor to measure a distance with an obstacle outside of the vehicle.

3 Claims, 4 Drawing Sheets

VEHICLE REAR ⟷ VEHICLE FRONT

VEHICLE REAR ⟷ VEHICLE FRONT

VEHICLE PRESENCE NOTIFICATION APPARATUS

CROSS REFERENCE TO RELATED APPLICATION

The present application is based on and incorporates herein by reference Japanese Patent Application No. 2010-6876 filed on Jan. 15, 2010.

FIELD OF THE INVENTION

The present invention relates to a vehicle presence notification apparatus for notifying a person, such as a pedestrian outside a subject vehicle or an occupant in another vehicle, of a presence or approach of the subject vehicle.

BACKGROUND OF THE INVENTION

[Patent document 1] JP-2006-199110 A (US2007/0257783 A1)
[Patent document 2] JP-H10-201001 A At the time of traveling of an electric vehicle or at the time of motor drive traveling of a hybrid vehicle, it may be desired that a person outside of the vehicle can recognize the presence of the vehicle approaching. To that end, an audio speaker is installed in the subject vehicle to thereby produce a notice sound outside of the vehicle such as a false engine sound and a false running sound for teaching the presence of the vehicle.

However, since the notice sound outputted from the audio speaker is diffused around, it may be heard by a pedestrian (for example, a pedestrian who is present in the back of the vehicle that advances forward) who is not present in a dangerous position, or a person who is in a vehicle compartment. Thus, the sense of discomfort may be given to the people other than a pedestrian who is present in the dangerous position.

The applicant filed Japanese Patent Application No. 2009-58456 (JP-2010-208557 A) proposing a vehicle presence notification apparatus which generates a notice sound by emitting an ultrasonic wave in the air based on an ultrasonic signal modulated according to an audible sound. The notice sound outputted by the vehicle presence notification apparatus has a significant directionality. Thus, the notice sound for teaching a presence of a vehicle approaching can be designed to be conveyed to a pedestrian or the like who needs to be notified of the presence of a danger. Thereby, the sense of discomfort due to the notice sound can be reduced for a pedestrian, who is not present in a dangerous place or a person who is inside of a vehicle compartment.

Even at the time of traveling of an electric vehicle or even at the time of motor drive traveling of a hybrid vehicle, a wind roar or a road surface sound occurs when a vehicle velocity becomes greater than a predetermined value. Even without generating a notice sound, a pedestrians can thus recognize the presence of the vehicle.

That is, the generation of the notice sound in the vehicle presence notification apparatus is only necessary for just the case where the vehicle runs at such a low vehicle velocity hardly producing a running sound. Accordingly, when the vehicle velocity is great or fast, the vehicle presence notification apparatus mounted in the vehicle is not utilized. This poses a disadvantage. In addition, from the request of reducing the number of in-vehicle components, it is desirable that the vehicle presence notification apparatus provides another function other than the generation of the notice sound.

SUMMARY OF THE INVENTION

The present invention is made so as to address the above disadvantage. It is an object of the present invention to provide a vehicle presence notification apparatus which can achieve another function other than generating of a notice sound.

To achieve the above object, according to an example of the present invention, a vehicle presence notification apparatus in a vehicle for reporting a presence of the vehicle to an outside of the vehicle is provided as follows. An ultrasonic signal generation section is configured to output an ultrasonic signal. A modulation section is configured to use the ultrasonic signal as a carrier wave and modulates the ultrasonic signal depending on an audible sound. A plurality of speaker-use ultrasonic transducer devices are configured to generate a notice sound by emitting an ultrasonic wave in mid air based on the ultrasonic signal modulated by the modulation section. At least one sensor-use ultrasonic transducer device is included in the plurality of speaker-use ultrasonic transducer devices. The sensor-use ultrasonic transducer device is a two-way transducer device that is enabled to perform not only transmission but also reception of an ultrasonic wave. The two-way transducer device has a first function as a speaker to generate a notice sound and a second function as an ultrasonic sensor to measure a distance with an obstacle outside of the vehicle. The second function of the two-way transducer device is operated when a velocity of the vehicle is equal to or greater than a predetermined value.

The ultrasonic transducer device which can transmit and receive is referred as a two-way transducer device and can be used not only as a speaker which transmits an ultrasonic wave, but also an ultrasonic sensor which receives an ultrasonic wave. For this reason, at least one of the ultrasonic transducer devices which generate notice sounds uses a two-way transducer; thereby, the vehicle presence notification apparatus can be provided with not only a function as a speaker, but also a function as an ultrasonic sensor.

In cases that a velocity of the vehicle is equal to or greater than a predetermined value, the function as an ultrasonic sensor is utilized. Thus, when the generation of any notice sound is unnecessary due to the vehicle velocity being fast, the vehicle presence notification apparatus can be used as an ultrasonic sensor for measuring a distance with an obstacle.

In addition, this allows the vehicle presence notification apparatus to also serve as an ultrasonic sensor for a vehicle collision prevention apparatus. Thus, there is no need to install another ultrasonic sensor for the vehicle collision prevention apparatus, enabling the reduction in the number of in-vehicle components.

According to another example of the present invention, a vehicle presence notification apparatus in a vehicle for reporting a presence of the vehicle to an outside of the vehicle is provided as follows. An ultrasonic signal generation section is configured to output an ultrasonic signal. A modulation section is configured to use the ultrasonic signal as a carrier wave and modulates the ultrasonic signal depending on an audible sound. A plurality of speaker-use ultrasonic transducer devices are configured to generate a notice sound by emitting an ultrasonic wave in mid air based on the ultrasonic signal modulated by the modulation section. At least one sensor-use ultrasonic transducer device is included in the plurality of speaker-use ultrasonic transducer devices. The sensor-use ultrasonic transducer device is a two-way transducer device that is enabled to perform not only transmission but also reception of an ultrasonic wave. The two-way transducer device has a first function as a speaker to generate a notice sound and a second function as an ultrasonic sensor to measure a distance with an obstacle outside of the vehicle. Herein, when a velocity of the vehicle is less than a predetermined value, an operation of the first function and an operation of the second function are switched into each other every a predetermined time period in the two-way transducer device.

Thus, the vehicle presence notification apparatus can be used for not only generating a notice sound but also measuring a distance with an obstacle even when a velocity of the vehicle is slow.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Configuration of First Example of Embodiment

Figure 1A:
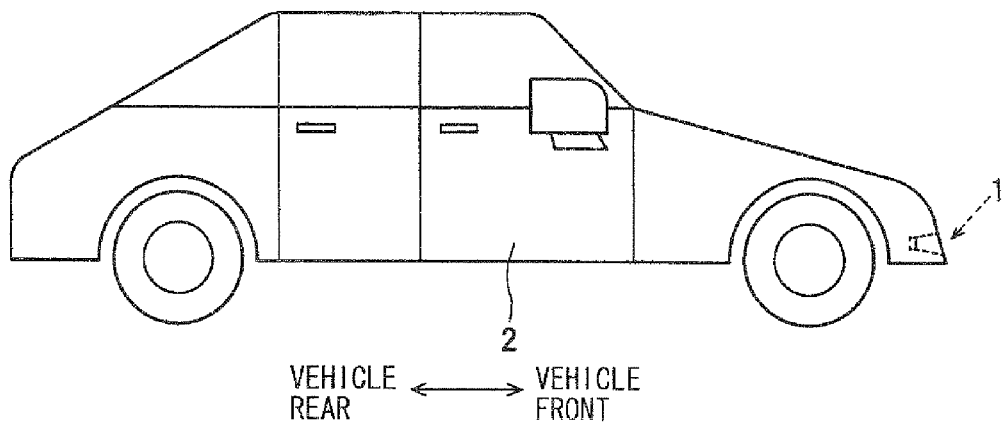
FIG. 1A is a diagram illustrating a vehicle which is equipped with a vehicle presence notification apparatus according to an embodiment of the present invention.

A configuration of a vehicle presence notification apparatus 1 according to a first example of an embodiment of the present invention is explained using FIGS. 1A and 1B, FIGS. 2A to 2E, and FIG. 3. The vehicle presence notification apparatus 1 is mounted in a subject vehicle 2. The vehicle presence notification apparatus 1 generates a notice sound (i.e., a false engine sound, or a false travel sound) for performing a notification, announcement, or report, for instance, at the time of traveling of an electric vehicle 2 or the motor drive traveling of a hybrid vehicle 2 so as to make a person outside of the vehicle 2 notice or recognize the vehicle 2 approaching.

The vehicle presence notification apparatus 1 includes several ultrasonic transducer devices 3 and a microcomputer 4. The several ultrasonic transducer devices 3 are attached to a bumper or front grill of the vehicle 2 for generating notice sounds. The microcomputer 4 functioning as a control circuit 4 supplies an electric power to a vibrator (not shown) of each of the ultrasonic transducer devices 3 while controlling an operation or a movement of each vibrator.

Each ultrasonic transducer device 3 transforms an electrical signal such as an electric voltage, which is inputted to the vibrator, into a mechanical vibration. Using such a mechanical vibration, each ultrasonic transducer device 3 generates a sonic wave which vibrates on a frequency of an ultrasonic range and serves as a speaker. Thus, each ultrasonic transducer device 3 may be also referred to as a speaker-use ultrasonic transducer device 3. The several ultrasonic transducer devices 3 are arranged on an identical plane such that with respect to each ultrasonic transducer device 3, the vibration generated by the vibrator goes to forward direction (i.e., front direction) of the vehicle to thereby configure a speaker array 6, as show in FIG. 1B.

At least one of several speaker-use ultrasonic transducer devices 3 configuring the speaker array 6 is a two-way (transmission) transducer device 7 which can transmit and receive an ultrasonic wave. In the present embodiment, one two-way transducer device 7 is included in the several speaker-use ultrasonic transducer devices 3. The two-way transducer device 7 not only serves as a speaker but also an ultrasonic sensor to measure a distance between the vehicle 2 and an obstacle outside of the vehicle, as explained later. Thus, the two-way transducer device 7 may be also referred to as a sensor-use (two-way) ultrasonic transducer device 7, and, furthermore, it may be also referred to as a speaker/sensor-use (two-way) ultrasonic transducer device 3, 7.

Furthermore, the microcomputer 4 has a known configuration containing: a CPU having a control function and a computation function; various kinds of storage devices such as ROM and RAM; an input device; and an output device. The microcomputer 4 includes the following: a transmission circuit 8, which is also referred to as a transmission section or means, for the ultrasonic transducer devices 3 to transmit an ultrasonic wave; and a reception circuit 9, which is also referred to as a reception section or means, for the two-way transducer device 7 to receive an ultrasonic wave.

The transmission circuit 8 includes the following: an audible sonic wave signal generation circuit 11, which is also referred to as an audible sonic wave signal generation section or means, to output a wave signal of an audible sound (called an audible sonic wave signal, refer to FIG. 2A), which is intended to be reproduced; an ultrasonic signal generation circuit 12, which is also referred to as an ultrasonic signal generation section or means, to output an ultrasonic signal (refer to FIG. 2B); a modulation circuit 13, which is also referred to as a modulation section or means, to modulate an ultrasonic signal, which is used as a carrier wave, according to an audible sound wave signal, thereby outputting a modulated wave signal (refer to FIG. 2C); and a drive circuit 14, which is also referred to as a drive section or means, to amplify a signal outputted from the modulation circuit 13 or the ultrasonic signal generation circuit 12 to an extent to enable driving of the ultrasonic transducer devices 3 and supplying electrical signals to the vibrators.

The ultrasonic transducer devices 3 other than the two-way transducer device 7 have only a function as a speaker. The vibrator of each of the transducer devices 3 vibrates based on the modulated ultrasonic wave signal (i.e., modulated wave signal); thereby, modulated wave (i.e., wave posterior to modulation) is emitted into mid air.

When the two-way transducer device 7 functions as a speaker, the vibrator vibrates based on the modulated wave signal to emit the modulated wave into mid air. When the two-way transducer device 7 functions as an ultrasonic sensor, the vibrator vibrates based on the ultrasonic signal (ultrasonic signal which is not modulated) outputted by the ultrasonic signal generation circuit 12 to emit an ultrasonic wave which is not modulated (also referred to as a non-modulated ultrasonic wave).

It is noted that in a duration that the modulated wave (i.e., wave posterior to modulation) emitted into the air is advancing, the following takes place. That is, the waveform is distorted due to the nonlinear characteristics of the air (refer to FIG. 2D); an audible sound based on the original audible sonic wave signal appears due to the self-demodulation (refer to FIG. 2E), and is recognized by a pedestrian or the like as a notice sound.

In addition, the vehicle presence notification apparatus 1 includes a switch device 16 which executes a signal switchover to switch a signal for driving the vibrator of the two-way transducer device 7 between a modulated ultrasonic signal for a speaker use and a non-modulated ultrasonic signal for a sensor use, depending on a velocity of the vehicle. The switch device 16 includes a relay or a switch, for example. When the vehicle velocity is equal to or greater than a predetermined value or velocity (for example, not less than 20 km/h), the switch device 16 executes the signal switchover to switch the input signal to the two-way transducer device 7 into a sensor-use signal being a non-modulated ultrasonic signal, based on vehicle velocity information from a vehicle velocity sensor (not shown).

The following explains a principle to measure a distance between an obstacle and the vehicle using the two-way transducer device 7. First, when the ultrasonic wave is transmitted from the two-way transducer device 7, the ultrasonic wave reaches and hits an obstacle; thus, the ultrasonic wave is reflected by the obstacle. The two-way transducer device 7 receives the reflected ultrasonic wave. Based on a time period from the time of the transmission up to the time of the reception, the distance to the obstacle is computable.

The calculation of the distance to the obstacle may be executed by the microcomputer 4. In the present embodiment, the microcomputer 4 outputs information on a clock time of the transmission and a clock time of the reception to a control circuit 17 of a collision prevention apparatus, which is also mounted in the subject vehicle 2. The control circuit 17 of the collision prevention apparatus thereby calculates the distance to the obstacle.

Operation of First Example

Even at the time of traveling of an electric vehicle or at the time of motor drive traveling of a hybrid vehicle, when such a vehicle runs at about 20 km/h, a tire noise due to a road surface sound etc. occurs, thereby generally reaching a noise level similar to that of a vehicle of an internal-combustion engine. Thus, in the present example, the predetermined vehicle velocity to switch between the sensor function and speaker function of the two-way transducer device 7 is determined to be 20 km/h, for instance.

Figure 1B:
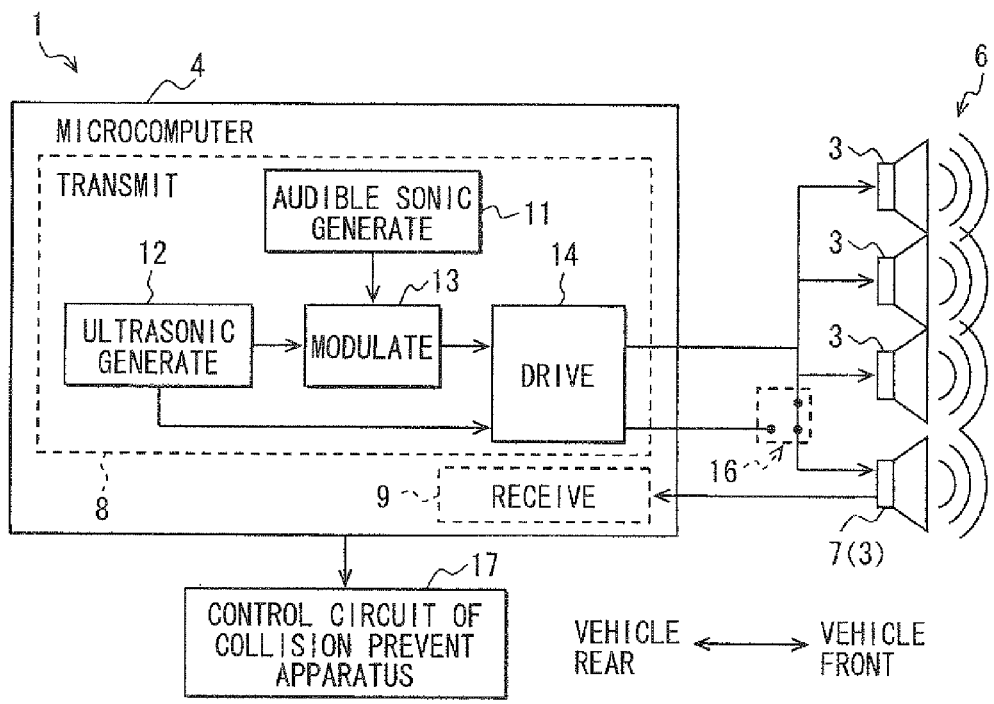
FIG. 1B is a diagram illustrating a configuration of a vehicle presence notification apparatus according to a first example of the embodiment of the present invention.
Figure 2A:
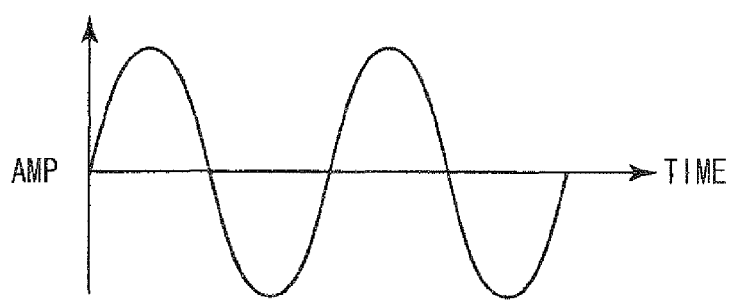
FIGS. 2A to 2E are diagrams for explaining a principle of an audible sound emission by the vehicle presence notification apparatus according to the embodiment.
Figure 2B:
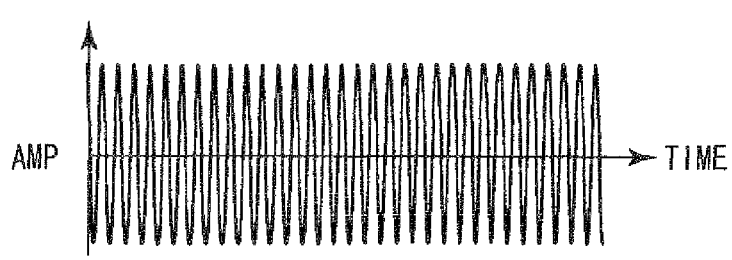
Figure 2C:
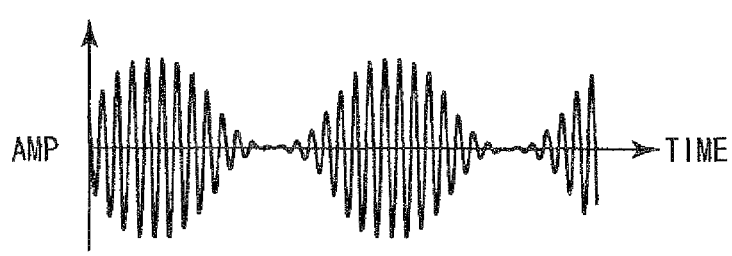
Figure 2D:
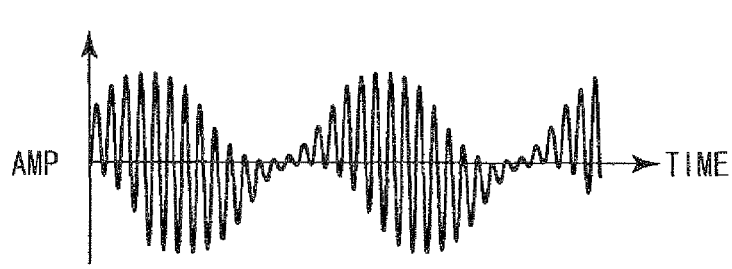
Figure 2E:
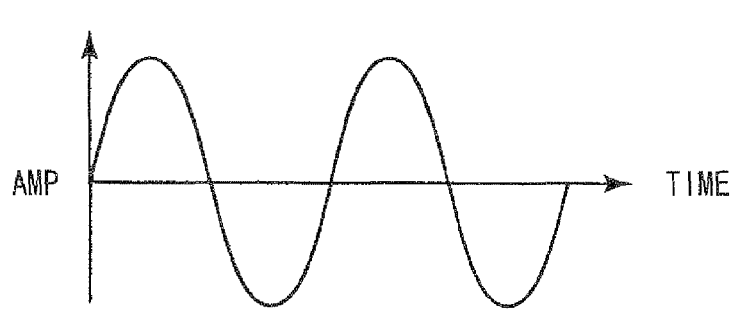

When the vehicle velocity is slower or less than 20 km/h, it is necessary to notify a pedestrian etc. of the presence of the vehicle approaching. Thus, all the ultrasonic transducer devices 3 including the two-way transducer device 7 are driven to generate notice sounds, as illustrated in FIG. 1B. It is noted that the input signal to the two-way transducer device 7 is a modulated ultrasonic wave, which is the same as those to the other ultrasonic transducer devices 3 excluding the two-way transducer device 7. The two-way transducer device 7 thus functions as a speaker to generate a notice sound.

Figure 3:
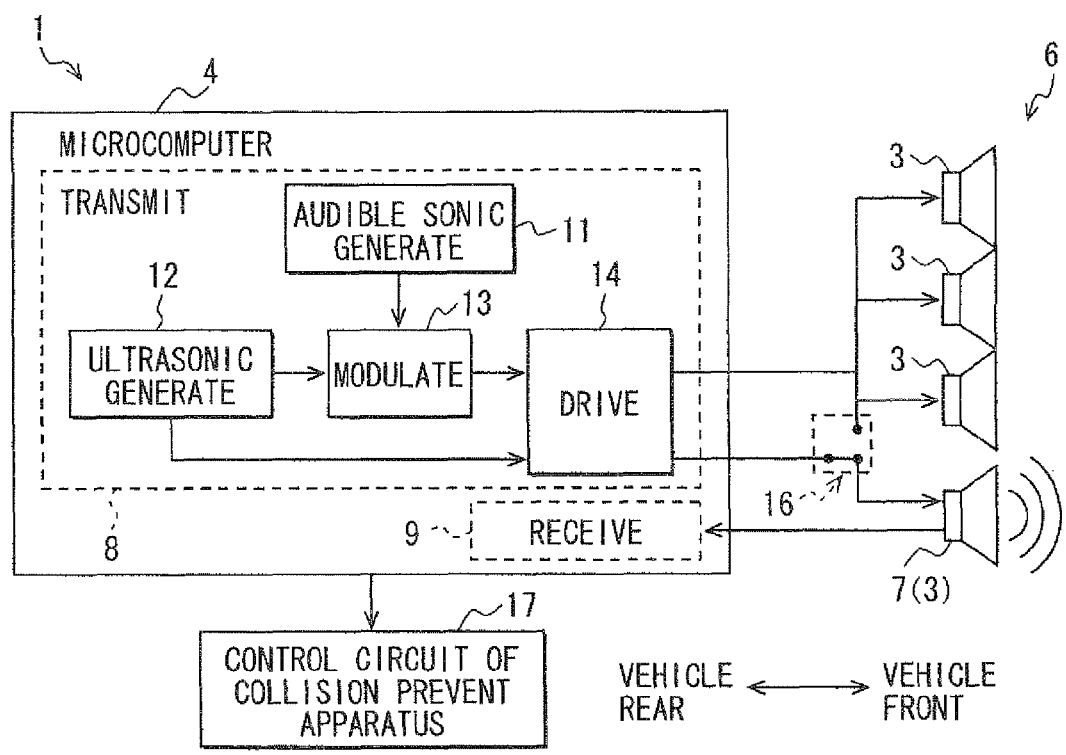
FIG. 3 is a diagram illustrating another configuration of the vehicle presence notification apparatus according to the first example.

In contrast, when the vehicle velocity is equal to or greater than 20 km/h, the drive of the ultrasonic transducer devices 3 other than the two-way transducer device 7 is suspended. Further, the input signal to the two-way transducer device 7 is switched by the switch device 16 into the sensor-use signal (i.e., non-modulated ultrasonic signal); thus, the two-way transducer device 7 functions as an ultrasonic sensor, as illustrated in FIG. 3.

At this time, the clock time information is outputted to the control circuit 17 of the collision prevention apparatus mounted in the vehicle. The clock time information includes (i) the clock time when the two-way transducer device 7 transmits an ultrasonic wave and (ii) the clock time when the two-way transmission transducer device 7 receives a reflected ultrasonic wave which hits an obstacle and is reflected. The control circuit 17 of the collision prevention apparatus thereby calculates the distance to the obstacle. Based on the calculated distance, instructions such as a brake control or an alarm generation are issued.

Effect of First Example

The vehicle presence notification apparatus 1 according to the present first example includes an ultrasonic signal generation circuit 12 that outputs an ultrasonic signal; a modulation circuit 13 that uses an ultrasonic signal as a carrier wave and modulates the ultrasonic signal depending on an audible sound; and several ultrasonic transducer devices 3, each of which generates a notice sound by emitting an ultrasonic wave in mid air based on the modulated ultrasonic signal.

Furthermore, one of the several ultrasonic transducer devices 3 configuring the speaker array 6 is a two-way transducer device 7 which can transmit and receive an ultrasonic wave. The two-way transducer device 7 has a first function as a speaker to generate a notice sound, and a second function as an ultrasonic sensor to measure a distance with an obstacle outside of the vehicle.

Further, the vehicle presence notification apparatus 1 causes the two-way transducer device 7 to function as a speaker to generate a notice sound like other ultrasonic transducer devices 3, basically. When the vehicle velocity is equal to or greater than a predetermined value, the two-way transducer device 7 is caused to function as an ultrasonic sensor.

According to the above-mentioned configuration, even when the vehicle velocity is fast, the vehicle presence notification apparatus 1 can be utilized as an ultrasonic sensor used in the vehicle collision prevention apparatus for measuring a distance with an obstacle. That is, even when the vehicle velocity is fast to thereby eliminate necessity to generate a notice sound, the vehicle presence notification apparatus 1 can be utilized.

In addition, this allows the vehicle presence notification apparatus 1 to also serve as an ultrasonic sensor for a vehicle collision prevention apparatus. Thus, there is no need to install another ultrasonic sensor for the vehicle collision prevention apparatus, enabling the reduction in the number of components in the vehicle.

Configuration of Second Example

Figure 4A:
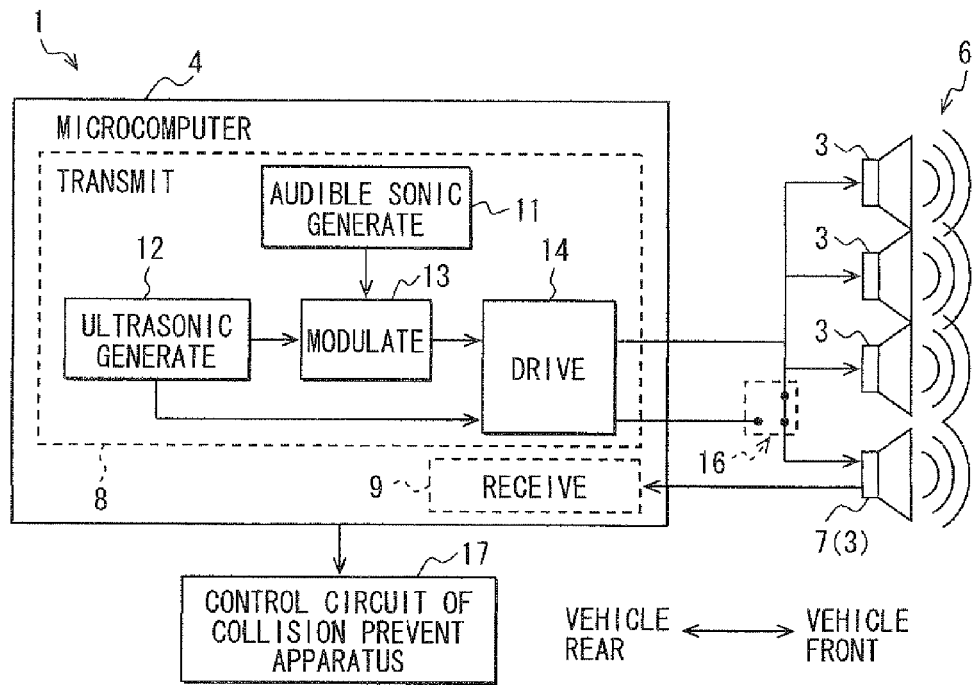
FIGS. 4A, 4B are diagrams illustrating configurations of a vehicle presence notification apparatus according to a second example of the embodiment of the present invention.
Figure 4B:
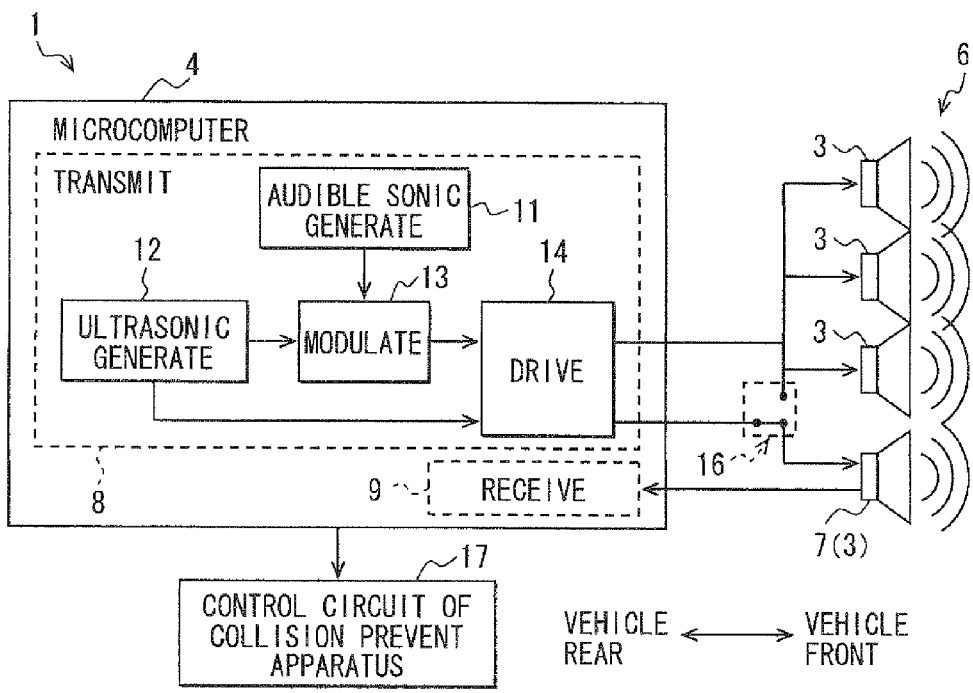

A configuration of a vehicle presence notification apparatus 1 according to a second example of the embodiment is explained mainly with respect to a difference from the first example using FIGS. 4A, 4B.

In the present example, when the vehicle velocity is less than the predetermined value or velocity, with respect to the two-way transducer device 7, the operation of the function as a speaker and the operation of the function as an ultrasonic sensor switch into each other every a predetermined time. That is, when the vehicle velocity is less than the predetermined velocity (for example, less than 20 km/h), The switch device 16 executes a signal switchover for the input signal to the two-way transducer device 7 to switch between a speaker-use signal (modulated ultrasonic wave signal) and a sensor-use signal (non-modulated ultrasonic signal) for every a predetermined time.

Operation of Second Example

When the vehicle velocity is less than the predetermined velocity, it is necessary to notify a pedestrian etc. of the presence or existence of the vehicle 2. Thus, a modulated ultrasonic wave signal is always inputted to the ultrasonic transducer devices 3 other than the two-way transducer device 7; the ultrasonic transducer devices 3 other than the two-way transducer device 7 is caused to generate a notice sound. In contrast, with respect to the two-way transducer device 7, an input signal is switched alternately between a speaker use signal (modulated wave signal) and a sensor use signal (non-modulated ultrasonic signal), every a predetermined time. That is, the status of FIG. 4A and the status of FIG. 4B are switched to each other.

Effect of Second Example

The vehicle presence notification apparatus 1 according to the present second example is provided as follows. In cases that a velocity of the vehicle is less than a predetermined value, with respect to the two-way transducer device 7, the first function as a speaker and the second function as an ultrasonic sensor switch into each other for every a predetermined time. Also when the vehicle velocity is less than the predetermined value, the vehicle presence notification apparatus 1 can be used for not only generating a notice sound but also measuring a distance with an obstacle.

Modification Example

The vehicle presence notification apparatus 1 according to the embodiment of the present invention is not limited to the above examples, but can be modified in the various manners. For example, one of the ultrasonic transducer devices 3 which configures the speaker array 6 is a two-way transducer device 7 in the first and second examples. However, more than one ultrasonic transducer devices 3 may be a two-may transducer device 7.

In addition, the first example and the second example may be combined. That is, when the vehicle velocity is equal to or greater than a predetermined velocity, the function as an ultrasonic sensor is provided to the two-way transducer device 7. When the vehicle velocity is less than the predetermined velocity, the function as an ultrasonic sensor and the function as a speaker may alternately provided to the two-way transducer device 7.

Aspects of the disclosure described herein are set out in the following clauses.

As an aspect of the disclosure, a vehicle presence notification apparatus in a vehicle for reporting a presence of the vehicle to an outside of the vehicle is provided as follows. An ultrasonic signal generation section is configured to output an ultrasonic signal. A modulation section is configured to use the ultrasonic signal as a carrier wave and modulates the ultrasonic signal depending on an audible sound. A plurality of speaker-use ultrasonic transducer devices are configured to generate a notice sound by emitting an ultrasonic wave in mid air based on the ultrasonic signal modulated by the modulation section. At least one sensor-use ultrasonic transducer device is included in the plurality of speaker-use ultrasonic transducer devices. The sensor-use ultrasonic transducer device is a two-way transducer device that is enabled to perform not only transmission but also reception of an ultrasonic wave. The two-way transducer device has a first function as a speaker to generate a notice sound and a second function as an ultrasonic sensor to measure a distance with an obstacle outside of the vehicle. The second function of the two-way transducer device is operated when a velocity of the vehicle is equal to or greater than a predetermined value.

As an optional aspect of the above vehicle present notification apparatus, when the velocity of the vehicle is less than the predetermined value, an operation of the first function and an operation of the second function may be switched into each other every a predetermined time period in the two-way transducer device.

Such a configuration can further provide an advantage that when a velocity of the vehicle is slow, the vehicle presence notification apparatus can be used for not only generating a notice sound but also measuring a distance with an obstacle.

According to another aspect of the disclosure, a vehicle presence notification apparatus in a vehicle for reporting a presence of the vehicle to an outside of the vehicle is provided as follows. An ultrasonic signal generation section is configured to output an ultrasonic signal. A modulation section is configured to use the ultrasonic signal as a carrier wave and modulates the ultrasonic signal depending on an audible sound. A plurality of speaker-use ultrasonic transducer devices are configured to generate a notice sound by emitting an ultrasonic wave in mid air based on the ultrasonic signal modulated by the modulation section. At least one sensor-use ultrasonic transducer device is included in the plurality of speaker-use ultrasonic transducer devices. The sensor-use ultrasonic transducer device is a two-way transducer device that is enabled to perform not only transmission but also reception of an ultrasonic wave. The two-way transducer device has a first function as a speaker to generate a notice sound and a second function as an ultrasonic sensor to measure a distance with an obstacle outside of the vehicle. Herein, when a velocity of the vehicle is less than a predetermined value, an operation of the first function and an operation of the second function are switched into each other every a predetermined time period in the two-way transducer device.

It will be obvious to those skilled in the art that various changes may be made in the above-described embodiments of the present invention. However, the scope of the present invention should be determined by the following claims.

What is claimed:

1. A vehicle presence notification apparatus in a vehicle for reporting a presence of the vehicle to an outside of the vehicle, the apparatus comprising:
    an ultrasonic signal generation section that outputs an ultrasonic signal;
    a modulation section that uses the ultrasonic signal as a carrier wave and modulates the ultrasonic signal depending on an audible sound;
    a plurality of speaker-use ultrasonic transducer devices that generate a notice sound by emitting an ultrasonic wave in mid air based on the ultrasonic signal modulated by the modulation section; and
    at least one sensor-use ultrasonic transducer device that is included in the plurality of speaker-use ultrasonic transducer devices,
        the sensor-use ultrasonic transducer device being a two-way transducer device that is enabled to perform not only transmission but also reception of an ultrasonic wave,
        the two-way transducer device having
            a first function as a speaker to generate a notice sound and
            a second function as an ultrasonic sensor to measure a distance with an obstacle outside of the vehicle,
        the second function of the two-way transducer device being operated when a velocity of the vehicle is equal to or greater than a predetermined value.

2. The vehicle presence notification apparatus according to claim 1, wherein
when the velocity of the vehicle is less than the predetermined value,
an operation of the first function and an operation of the second function are switched into each other every a predetermined time period in the two-way transducer device.

3. A vehicle presence notification apparatus in a vehicle for reporting a presence of the vehicle to an outside of the vehicle, the apparatus comprising:
an ultrasonic signal generation section that outputs an ultrasonic signal;
a modulation section that uses the ultrasonic signal as a carrier wave and modulates the ultrasonic signal depending on an audible sound;
a plurality of speaker-use ultrasonic transducer devices that generate a notice sound by emitting an ultrasonic wave in mid air based on the ultrasonic signal modulated by the modulation section; and
at least one sensor-use ultrasonic transducer device that is included in the plurality of speaker-use ultrasonic transducer devices, the sensor-use ultrasonic transducer device being a two-way transducer device that is enabled to perform not only transmission but also reception of an ultrasonic wave,
the two-way transducer device having
a first function as a speaker to generate a notice sound and
a second function as an ultrasonic sensor to measure a distance with an obstacle outside of the vehicle,
wherein
when a velocity of the vehicle is less than a predetermined value, an operation of the first function and an operation of the second function are switched into each other every a predetermined time period in the two-way transducer device.

* * * * *